United States Patent [19]

Schiel et al.

[11] Patent Number: 4,472,865
[45] Date of Patent: Sep. 25, 1984

[54] ROLL FOR TREATMENT OF PAPER WEBS OR THE LIKE

[75] Inventors: Christian Schiel, Heidenheim; Robert Wolf, Herbrechtingen, both of Fed. Rep. of Germany

[73] Assignee: J. M. Voith GmbH, Heidenheim, Fed. Rep. of Germany

[21] Appl. No.: 245,177

[22] Filed: Mar. 18, 1981

[30] Foreign Application Priority Data

Mar. 26, 1980 [DE] Fed. Rep. of Germany ....... 3007112

[51] Int. Cl.$^3$ ............................................. B21B 13/02
[52] U.S. Cl. ............................... 29/116 AD; 384/117
[58] Field of Search .............. 384/114, 113, 117, 309, 384/310, 311, 312, 115, 118; 29/116 AD

[56] References Cited

U.S. PATENT DOCUMENTS

| 3,802,044 | 4/1974 | Spillman et al. | 29/113 AD |
| 3,846,883 | 11/1974 | Biondetti | 29/116 AD |
| 4,064,607 | 12/1977 | Wolf | 29/116 AD |
| 4,325,585 | 4/1982 | Sugita | 384/117 |

FOREIGN PATENT DOCUMENTS 1359839 7/1974 United Kingdom .

Primary Examiner—Lenard A. Footland
Attorney, Agent, or Firm—St. Onge, Steward, Johnston & Reens

[57] ABSTRACT

A roll for pressure treatment of paper webs has a stationary shaft which is spacedly surrounded by the concave cylindrical internal surface of a rotary sleeve. The shaft carries a row of pressure shoes which define therewith plenum chambers for a hydraulic fluid serving to urge the convex cylindrical external surfaces of the shoes toward the internal surface of the sleeve. Each external surface has a centrally located primary hydrostatic bearing pocket which communicates with the respective plenum chamber and a set of four auxiliary hydrostatic bearing pockets which surround the respective primary pocket and receive only that hydraulic fluid which overflows the lands between the primary pocket and the auxiliary pockets. The pockets in each external surface are surrounded by a marginal portion of such surface and the primary pocket has arms which extend to the marginal portion and each of which is flanked by a pair of auxiliary pockets. The arms of the primary pocket are parallel to the longitudinal axis of the sleeve and/or to an axis which is normal to the longitudinal axis. The auxiliary pockets form groups which make oblique angles with the two axes. If the external surfaces of the shoes are rectangular, the groups of auxiliary pockets extend substantially diagonally of the respective external surfaces.

9 Claims, 6 Drawing Figures

ROLL FOR TREATMENT OF PAPER WEBS OR THE LIKE

CROSS-REFERENCE TO RELATED CASE

The roll of the present invention constitutes an improvement over and a further development of the roll which is disclosed in the commonly owned U.S. Pat. No. 4,064,607 granted Dec. 27, 1977 to Robert Wolf for "Compression roller for paper producing machinery".

BACKGROUND OF THE INVENTION

The present invention relates to rolls for the treatment of running webs, especially to improvements in rolls for pressure treatment of running paper webs in paper making and/or processing machines.

U.S. Pat. No. 3,846,883 granted Nov. 12, 1974 to Biondetti discloses a roller for pressure treatment of webs. The roller comprises a flexible shaft and a rigid sleeve which spacedly surrounds the shaft and rotates in response to engagement with a running web of paper or the like. The means for transmitting forces between the sleeve and the shaft comprises several bearing shoes which have convex cylindrical surfaces adjacent to the concave cylindrical internal surface of the sleeve. In the embodiment which is illustrated in FIG. 5 of the patent to Biondetti, the convex cylindrical surface of each shoe has several hydrostatic bearing pockets which are filled with pressurized hydraulic fluid to prevent metal-to-metal contact between the sleeve and the shoes. Rolls of the just outlined character can be used in paper making machines to expel surplus moisture from freshly formed paper webs or in calenders to enhance the smoothness of or to otherwise treat the surfaces of running webs consisting of paper or the like. Furthermore, such rolls can be used in many other types of machines wherein discrete sheets or continuous webs or strips of flexible material are caused to pass through the nips of rolls which are driven to advance the webs or sheets or which receive motion in response to entrainment of sheets or webs therebetween.

The purpose of bearing shoes between the shaft and the rotatable sleeve or shell is that the sleeve is much less likely to undergo deformation so that the width of the nip remains constant from one end and all the way to the other end of the roll. Furthermore, the bearing shoes render it possible to vary the pressure against the internal surface of the sleeve from section to section, as considered in the axial direction of the roll, so as to ensure that the resistance to deformation is greatest in the region where the sleeve is most likely to be deformed. This also contributes to the possibility of ensuring that the width of the nip remains constant all the way between the ends of the cooperating rolls.

The external cylindrical surface of each bearing shoe is complementary to the internal cylindrical surface of the shell. In the embodiment which is shown in FIG. 5 of the patent to Biondetti, the external surface of each bearing shoe has a centrally located hydrostatic bearing pocket and two or more additional bearing pockets in circumferential orientation around the central pocket. The patentee suggests that this substantially reduces friction between the stabilizing edge around the central pocket and the shell. The two additional pockets which are actually shown in FIG. 5 of Biondetti are disposed at the opposite sides of the central pocket, as considered in the circumferential direction of the shell.

FIG. 3 of U.S. Pat. No. 3,802,044 granted Apr. 9, 1974 to Spillmann et al. discloses a modified bearing shoe with a circular external surface which is formed with four equal sector-shaped hydrostatic bearing pockets. Two of the pockets are halved by a plane which includes the longitudinal axis of the sleeve, and the remaining two pockets are halved by a plane which is normal to the longitudinal axis of the sleeve. The webs or lands which separate the neighboring pockets from each other make angles of approximately 45 degrees with the longitudinal axis of the sleeve as well as with a transverse axis which is normal to and intersects the longitudinal axis. It can be said that the lands or webs between the neighboring sector-shaped pockets extend diagonally of the exposed cylindrical surface of the bearing shoe.

The hydrostatic pockets which are disclosed by Biondetti and Spillmann et al. can stabilize the respective bearing shoes. Such shoes must be capable of performing various movements relative to the shaft. As a rule, the bearing shoes are mounted for movement radially of the shaft as well as for tilting movement not unlike the parts of universal joints. The stabilizing effect of the hydrostatic pockets is to be felt in several directions, namely, as considered in the axial direction as well as in the circumferential direction of the sleeve (i.e., in the direction of as well as at right angles to the central longitudinal axis of the sleeve). Otherwise stated, the hydrostatic bearing pockets of the aforediscussed conventional bearing shoes ensure that the axis of each bearing shoe extends exactly radially of the associated sleeve or shell. The patent to Spillmann et al. further discloses the possibility of rotating the array of pockets shown in FIG. 3 through 45 degrees so that two of the lands between neighboring bearing pockets would be parallel to and the remaining two lands would extend at right angles to the longitudinal axis of the sleeve. It is suggested that such orientation of the lands is more likely to prevent undesirable tilting in a plane which is normal to the longitudinal axis of the sleeve.

An object which is common to the inventions disclosed in the aforediscussed patents is to ensure that the marginal portion of the exposed external surface of each bearing shoe be maintained at a constant distance from the internal surface of the sleeve, i.e., that each and every portion of such marginal portion be disposed at a predetermined distance from the sleeve. This is intended to guarantee the formation of a liquid film having a constant thickness and to prevent direct surface-to-surface (metal-to-metal) contact between the bearing shoes and the sleeve. It has been found that the proposals of Biondetti and Spillmann et al. cannot ensure total absence of metal-to-metal contact between the bearing shoes and the sleeve under any and all circumstances which arise when a roll of the above outlined charcter is in actual use. In many instances, the shoes are likely to destroy the liquid films between their external surfaces and the internal surface of the sleeve, especially when the roll is idle (i.e., when the sleeve does not rotate about the shaft) and/or during the initial stage of acceleration of the sleeve from zero speed.

OBJECTS AND SUMMARY OF THE INVENTION

An object of the invention is to provide a novel and improved roll which can be used for the treatment of running paper webs or the like and wherein direct contact between the bearing shoes and the rotary sleeve is prevented or its likelihood reduced even under those circumstances which normally entail such contact in conventional rolls.

Another object of the invention is to provide a pressure applying roll wherein the bearing shoes are constructed, mounted and configured in such a way that they are held out of direct contact with the sleeve even if the roll is idle and/or when the sleeve of the roll begins to rotate.

A further object of the invention is to provide a novel and improved bearing shoe for use in a roll of the above outlined character.

An additional object of the invention is to provide a machine, especially a paper processing machine, which embodies a roll with one or more bearing shoes of the above outlined character.

Another object of the invention is to provide a novel and improved distribution of hydrostatic bearing pockets on the surfaces of bearing shoes in the above outlined rolls.

A further object of the invention is to provide a roll whose useful life is longer than the useful lives of heretofore known rolls.

Another object of the invention is to provide a novel and improved system for supplying pressurized hydraulic fluid to the hydrostatic bearing pockets in the bearing shoes of rolls of the above outlined character.

An ancillary object of the invention is to provide a novel and improved pressure roll which can be installed in many types of existing paper treating, paper making and/or other machines as a superior substitute for presently employed rolls.

The invention is embodied in a roll for pressure treatment of webs, especially paper webs. The roll comprises an elongated shaft which can be mounted in a stationary frame or in movable bearings of a calender or the like, and a hollow cylindrical sleeve having a longitudinal axis, a transverse axis normal to the longitudinal axis, and a concave cylindrical internal surface spacedly surrounding the shaft. The roll further comprises at least one bearing shoe which is interposed between the shaft and the sleeve and is movable substantially radially of as well as tiltable relative to the shaft. The shaft and the shoe define a plenum chamber which contains a supply of pressurized hydraulic fluid serving to urge the shoe toward the internal surface of the sleeve. In accordance with a feature of the invention, the shoe has a convex cylindrical external surface which is adjacent to the internal surface of the sleeve and is formed with a substantially centrally located primary hydrostatic bearing pocket communicating with the plenum chamber so that it is filled with pressurized fluid which maintains the external surface of the shoe out of direct metal-to-metal contact with the internal surface of the sleeve, and at least three but preferably more auxiliary hydrostatic bearing pockets surrounding the primary pocket and receiving only such fluid which leaks from the primary pocket by flowing along lands which form part of the external surface of the shoe and separate the primary pocket from the auxiliary pockets. The primary pocket has arms which are flanked by pairs of auxiliary pockets, and such arms extend in parallelism with the one and/or other axis of the sleeve. The auxiliary pockets form groups of two which extend at oblique angles to the axes of the sleeve. The external surface of the shoe has a marginal portion which surrounds the pockets, and the arms of the primary pocket extend all the way to the marginal portion of the external surface.

The shoe is preferably formed with a single channel which connects the plenum chamber with the central portion of the primary pocket.

The novel features which are considered as characteristic for the invention are set forth in particular in the appended claims. The invention itself, however, both as to its construction and its mode of operation, together with additional objects and advantages thereof, will be best understood from the following description of specific embodiments when read in connection with the accompanying drawing.

DESCRIPTION OF THE PREFERRED EMBODIMENTS

Figure 2:
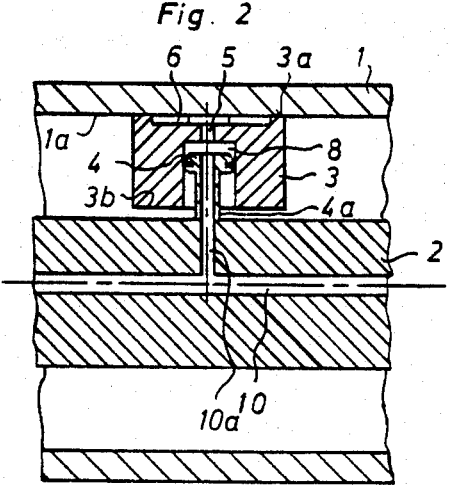
FIG. 2 is a fragmentary axial sectional view of the roll, substantially as seen in the direction of arrows from the line II—II of FIG. 1.
Figure 1:
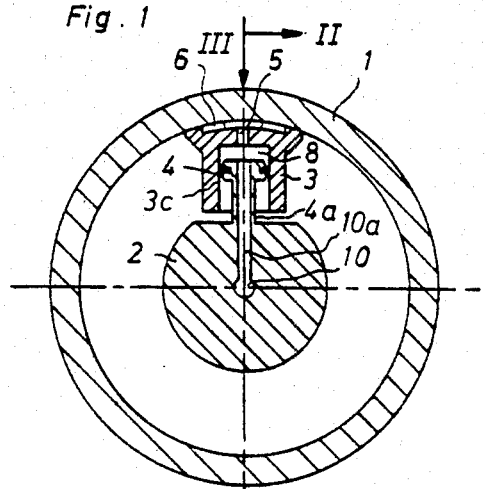
FIG. 1 is a schematic transverse sectional view of a roll which embodies one form of the present invention.

Referring first to FIGS. 1 and 2, there is shown a portion of a roll which can be used in a machine for the making and/or processing of paper webs or the like. For example, the roll can be utilized with several additional rolls to form part of a calender wherein the neighboring rolls define one or more nips through which the web- or strip-shaped material passes during treatment. The roll of FIGS. 1 and 2 comprises a hollow cylindrical sleeve or shell 1 which spacedly surrounds a stationary shaft or carrier rail 2. The end portions of the shaft 2 are mounted in a suitable frame and the end portions of the shell 1 are mounted on suitable bearings which surround the adjacent portion of the shaft 2. Alternatively, and as disclosed in German patent application Ser. No. P 30 07 112.6, the stationary frame can be replaced by shiftable bearings for the end portions of the shaft 2. Such bearings are utilized in calenders.

The means for transmitting forces between the concave cylindrical internal surface 1a of the shell 1 and the shaft 2 comprises a battery or row of discrete bearing elements or shoes 3 of which only one is shown in the drawing. Reference may be had to the aforementioned U.S. Pat. No. 3,802,044 to Spillmann et al. wherein FIG. 1 shows a shaft the end portions of which are mounted in a stationary frame and which is surrounded by a hollow cylindrical sleeve. Bearings are interposed between the end portions of the sleeve and the corresponding portions of the shaft. FIG. 1 of this patent further shows a row of five bearing shoes within the confines of the cylindrical sleeve. For the sake of completeness, the disclosure of this patent is incorporated herein by reference.

Figure 3:
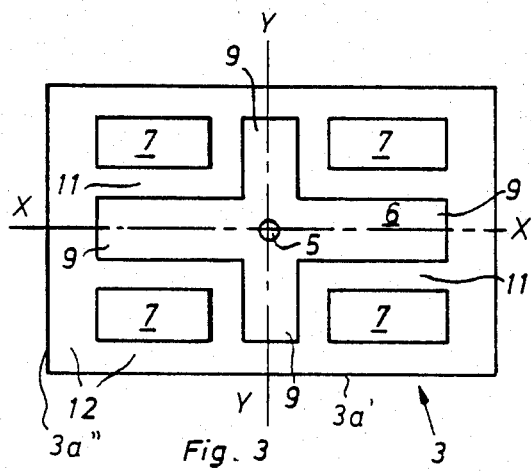
FIG. 3 is a greatly enlarged plan view of a bearing shoe in the roll of FIGS. 1 and 2, substantially as seen in the direction of arrow III in FIG. 1.

The exposed upper side or surface 3a of the bearing shoe 3 which is shown in FIGS. 1 and 2 constitutes a portion of a convex cylindrical surface which is complementary to the concave cylindrical internal surface 1a of the shell 1. The surface 3a has a rectangular outline (see FIG. 3) with two longer sides 3a' which are parallel to the axis X—X and two shorter sides 3a" which are parallel to the axis Y—Y. The axis X—X is parallel to the longitudinal axis of the shell 1, and the axis Y—Y is normal to the axis X—X. FIG. 3 shows that each of the axes X—X and Y—Y divides the surface 3a into a pair of mirror symmetrical halves.

The shoe 3 has a second surface 3b which is located opposite the surface 3a and is adjacent to but spaced apart from the external surface of the shaft 2. The surface 3b has a blind bore 3c which receives a piston 4 having a piston rod 4a rigid or integral with the shaft 2. The peripheral surface of the piston 4 is rounded so that the shoe 3 can be tilted with reference to the shaft 2. Furthermore, the shoe 3 can move radially of the shaft 2, i.e., in the axial direction of the piston 4 and its piston rod 4a. Such universal movability of the shoe 3 with reference to the piston 4 is desirable in order to compensate for flexure of the shaft 2 in response to transmission of substantial bending forces from the shell 1 via bearing shoe 3.

If desired, the surface 3b of the bearing shoe 3 can be provided with a radially inwardly extending projection constituting a plunger which is received, with requisite clearance, in a cylindrical bore machined into the peripheral surface of the shaft 2.

The shaft 2 has an axial bore 10 which supplies pressurized hydraulical fluid to a radial bore 10a extending through the shaft 2, through the piston rod 4a and piston 4 and serving to deliver pressurized fluid to a plenum chamber 8 constituting the outermost portion of the bore 3c in the surface 3b of the shoe 3. If the illustrated piston 4 is replaced by a plunger extending into a radial bore of the shaft 2, the plenum chamber constitutes the radially innermost portion of the bore in the shaft 2.

The purpose of hydraulic fluid in the plenum chamber 8 is to bias the shoe 3 toward the internal surface 1a of the sleeve 1. However, direct metal-to-metal contact between the shoe 3 and the sleeve 1 is prevented by the provision of several hydrostatic bearing pockets or recesses which are machined into the surface 3a of the shoe 3 and are illustrated in FIG. 3. These pockets include a centrally located primary pocket 6 and four auxiliary or satellite pockets 7 surrounding the pocket 6. The centrally located primary pocket 6 has a cruciform shape with a central portion surrounding a radially extending channel or port 5 which connects the pocket 6 with the plenum chamber 8. In addition, the pocket 6 has four extensions or arms 9 which extend between the neighboring pairs of auxiliary pockets 7. It will be noted that the surface 3a has a frame-like marginal portion 12 which surrounds the auxiliary pockets 7 and the arms 9 of the central pocket 6 and is adjacent to the sides 3a' and 3a" of the surface 3a. In addition, the surface 3a has four substantially L-shaped surface portions or lands 11 each of which separates an auxiliary pocket 7 from two neighboring arms 9 of the primary pocket 6. As can be seen in FIG. 3, the auxiliary pockets 7 receive only such hydraulic fluid which overflows the respective lands 11, i.e., only such fluid which escapes or leaks from the central pocket 6.

The auxiliary pockets 7 can be said to form two pairs or groups of pockets which extend diagonally of the surface 3a and make oblique angles with the axes X—X and Y—Y. This can be readily seen in the plan view of FIG. 3. The tip or outermost portion of each arm 9 extends all the way to the respective part of marginal portion 12 of the surface 3a. It will be noted that those parts of the marginal portion 12 which are adjacent to the sides 3a' are somewhat narrower than the parts of marginal portion 12 which are adjacent to the shorter sides 3a". However, this is not crucial, i.e., the width of the shorter parts of the marginal portion 12 can equal or be less than the width of the longer parts. The auxiliary pockets 7 are disposed at the four corners of the surface 3a, and the primary pocket 6 substantially fills the space within the confines of the four auxiliary pockets 7. The feature that the auxiliary pockets 7 are disposed at the corners of the surface 3a and are, therefore, remote or reasonably remote from the axes X—X and Y—Y is desirable and advantageous because such distribution of auxiliary pockets contributes to the restoring action of the hydrostatic pockets upon the orientation of the shoe 3 relative to the sleeve 1. Such distribution of the auxiliary pockets 7 and such configuration of the centrally located primary pocket 6 contributes to the stabilizing effect of the hydrostatic bearing pockets upon the orientation of the shoe 3 relative to the sleeve 1. The auxiliary pockets 7 have a rectangular outline because the surface 3a is rectangular. However, it is equally possible to increase the width of the shorter arms 9 and to utilize auxiliary pockets which have a substantially square outline. It is further possible to utilize a centrally located pocket having relatively narrow as well as relatively wide arms, i.e., the width of all four arms 9 need not be the same.

The feature that the arms 9 are parallel with the axes X—X and Y—Y is desirable and advantageous because the fluid which fills such arms can exert a very pronounced and practically immediate restoring action upon the orientation of the shoe 3 relative to the internal surface 1a of the casing 1 as soon as the shoe 3 is only slightly inclined with reference to the shell 1, i.e., as soon as the width of a portion of the gap between the surfaces 1a and 3a is not uniform throughout the entire width and length of the surface 3a.

An important advantage of the improved roll is that each bearing shoe 3 must be provided only with a single port or channel 5 for admission of pressurized fluid from the respective plenum chamber into the central portion of the associated hydrostatic bearing pocket 6. Though FIG. 5 of the aforementioned U.S. patent to Biondetti shows what appears to be a similar design (this Figure does not show discrete ports or channels for admission of pressurized fluid into the additional bearing pockets), the patent does not disclose any means for ensuring adequate delivery of fluid to each additional pocket. It has been found that the provision of relatively long lands 11 between the primary pocket 6 and the auxiliary pockets 7 shown in FIGS. 1 to 3 ensures adequate supply of fluid in each of the auxiliary pockets. This is attributable to the novel configuration of the primary pocket 6, i.e., this pocket has several arms 9 which are flanked by pairs of auxiliary pockets 7 so that the length of the lands 11 is considerable with attendant greater likelihood of overflow of fluid from the pocket 6 into the pockets 7. In any event, the rate of flow of fluid from the pocket 6 into the pockets 7 along the respective lands 11 is at least as pronounced as or greater than the rate of flow of fluid from the pockets 7 and the interior of the sleeve 1 (i.e., along the marginal portion 12 of the surface 3a).

The absence of discrete connections between the plenum chamber 8 and the auxiliary pockets 7 is desirable and advantageous because this ensures that the pressure of fluid in the primary pocket 6 exceeds the pressure of fluid in the auxiliary pockets. Also, the pressure differential between the primary pocket 6 and the plenum chamber 8 is preferably small, i.e., the cross-sectional area of the port or channel 5 is relatively large so that the port 5 is not likely to be clogged when the roll is in use. Absence of clogging further reduces the danger of metal-to-metal contact between the head 3 and the sleeve 1.

The aforediscussed orientation of arms 9 (so that they extend in the longitudinal direction of and at right angles to the axis X—X of the sleeve 1) also contributes to more satisfactory establishment and retention or maintenance of a fluid film between the surfaces 1a and 3a. Such orientation of the arms 9 renders it possible to assemble the auxiliary pockets 7 into groups or pairs of pockets which extend diagonally of the surface 3a, i.e., these groups make oblique angles with the axes X—X and Y—Y. It has been found that such orientation or distribution of the arms 9 and of the groups of auxiliary pockets 7 contributes to even more satisfactory stabilization of the bearing shoe 3 relative to the sleeve 1, especially as regards the tendency of the shoe 3 to turn about the axis of the piston 4 (i.e., about an axis which is normal to the axis X—X). Mere retention of a bearing head 3 in a position in which the axis of the bearing head is normal to the axis X—X does not suffice to invariably prevent direct contact between the surfaces 1a and 3a because holding of the shoe against movement from such radial position does not exclude rotation of the shoe about its own axis (i.e., about the axis of the bore 3c) and the resulting metal-to-metal contact with the sleeve.

The shoe 3 could be held against rotation about its axis by mechanical means, e.g., by the provision of suitable abutments or stops which would hold the shoe against rotation about an axis which is normal to the axis X—X. However, it has been found that the solution which is shown in FIGS. 1 to 3 is simpler, more reliable and less expensive. British Pat. No. 1,359,839 discloses an annular hydrostatic bearing pocket with a cluster of relatively small triangular additional pockets therearound. The additional pockets can be said to form groups or pairs which extend diagonally of the exposed surface of the bearing shoe. However, the additional pockets receive pressurized fluid by way of narrow channels which are equipped with flow restrictors so that the likelihood of clogging of such narrow channels with impurities which are contained in the hydraulic fluid is very pronounced. Moreover, the hydrostatic pockets of the British patent are provided in a concave surface forming part of a bearing for the convex cylindrical external surface of a roller.

Figure 4:
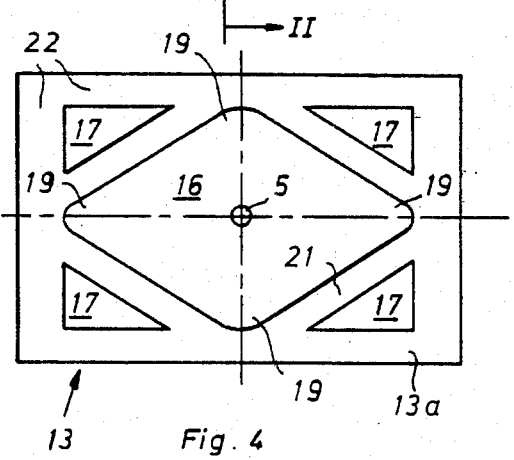
FIG. 4 is a similar plan view of a modified bearing shoe.

The bearing shoe 13 of FIG. 4 has a rectangular surface 13a which forms part of a convex cylindrical surface and has a centrally located primary pocket 16 with four extensions or arms 19 and four auxiliary or satellite pockets 17 of triangular outline. The pockets 17 are located at the four corners of the surface 13a which has a frame-like marginal portion 22 and four lands or intermediate portions 21. Each land 21 extends between a pair of extensions 9 and the respective marginal pocket 17. The primary pocket 16 resembles a diamond and the tips of its arms 19 extend all the way to the respective parts of the marginal portion 22 of the surface 13a. The reference character 5 again denotes a port or channel which supplies pressurized hydraulic fluid from a plenum chamber (not shown) to the primary pocket 16. The auxiliary pockets 17 receive only such fluid which overflows the respective lands 21.

Figure 5:
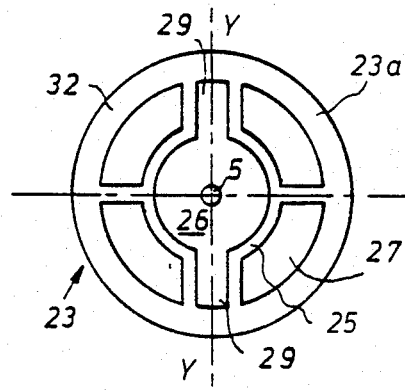
FIG. 5 is a plan view of a third bearing shoe.

FIG. 5 illustrates the surface 23a of a circular bearing shoe 23 which can be used as a substitute for the shoe 3 or 13. The primary pocket 26 of the surface 23a receives pressurized hydraulic fluid by way of a port or channel 5 and has two extensions or arms 29 which extend in the direction of the transverse axis Y—Y. The surface 23a is further formed with four arcuate auxiliary pockets 27 which are separated from each other and from the central pocket 26 by relatively narrow lands 25. The reference character 32 denotes the marginal portion of the surface 23a. It will be noted that the tips of the arms 29 of the central pockets 26 again extend to the respective parts of the marginal portion 32 of the surface 23a.

It goes without saying that the round bearing shoe 23 of FIG. 5 can be replaced with an oval shoe or with a shoe which resembles an oval or circular body but has a relatively large number of facets.

Figure 6:
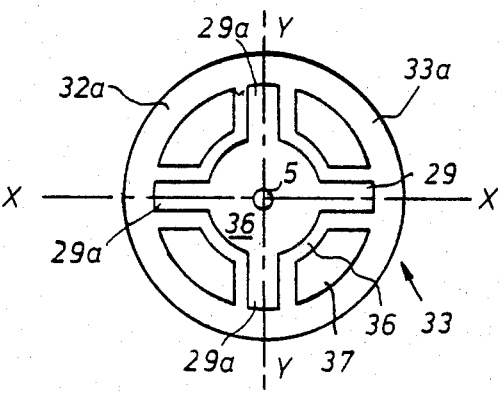
FIG. 6 is a similar plan view of a fourth bearing shoe.

FIG. 6 shows a fourth bearing shoe 33 which is similar to the shoe 23 of FIG. 5 and has a cylindrical convex surface 33a formed with a cruciform primary pocket 36 having four arms 29a and with four auxiliary pockets 37 separated from the primary pocket by relatively narrow lands 36. The reference character 32a denotes the marginal portion of the surface 33a. As explained in connection with FIG. 5, the shoe 33 can be replaced with a shoe having an oval or polygonal outline whereby the number of the sides or facets greatly or substantially exceeds the number of sides of the shoe 3 or 13. The arms 29a include a pair of arms which are parallel with the axis X—X and two arms which are parallel with the axis Y—Y. The advantages of such distribution of arms 29a are the same as those of the arms 9 shown in FIG. 3.

In many instances, the auxiliary pockets receive requisite quantities of hydraulic fluid if the primary pocket is formed with only two extensions or arms. However, the primary pockets which are shown in FIGS. 3, 4 and 6 are preferred at this time because they invariably ensure adequate filling of auxiliary pockets with hydraulic fluid. As a rule, the machining of primary pockets of cruciform shape is simpler and less expensive than the machining of otherwise configurated primary pockets.

The utilization of bearing shoes whose external surfaces have a polygonal (particularly a rectangular) outline has been found to be highly advantageous for several reasons. First of all, such configuration is relatively simple and, furthermore, the auxiliary pockets 7 or 17 can be located at a considerable distance from the center (port 5) of the respective primary pocket 6 or 16. Such placing of auxiliary pockets at a substantial distance from the axis of the respective shoe reduces the likelihood of rotation of the shoe about its axis, i.e., the fluid in the auxiliary pockets 7 or 17 is most likely to prevent turning of the shoe 3 or 13 about the axis of the port 5. The utilization of bearing heads having rectangular external surfaces with auxiliary pockets at the four corners and a cruciform primary pocket has been found to constitute one of the most satisfactory solutions of preventing undesirable turning of the shoe about its own axis, i.e., about the axis of the respective liquid-supplying port. It will be readily appreciated that the length of the lands 11 in FIG. 3 is greater than the length of the lands 21 on the convex surface 13a shown in FIG. 4 because the primary pocket 16 of the shoe 13 does not have a cruciform shape. Moreover, resort to a cruciform primary pocket renders it possible to employ relatively large auxiliary pockets which also contributes to the stablizing effect of the auxiliary pockets, i.e., to prevention of rotation of the shoe about its own axis. A comparison of FIGS. 3 and 4 shows that the length of those lands 11 which separate two arms 9 of the primary pocket 6 from a given auxiliary pocket 7 equals or approximates the length of that part of the marginal portion 12 which surrounds the given auxiliary pocket. In other words, the likelihood that the rate of escape of fluid from an auxiliary pocket 7 along the corresponding part of the marginal portion 12 would exceed the rate of flow of fluid from the primary pocket 6 into such auxiliary pocket is much less pronounced than in the embodiment of FIG. 4.

The effective cross-sectional area of a central or primary pocket is preferably between 0.7 and 1.5 times the effective cross-sectional area of the respective plenum chamber. This is desirable and advantageous because such ratio ensures the establishment of a satisfactory pressure differential between the interior of the primary pocket and the interior of the respective plenum chamber.

We claim:

1. A roll for pressure treatment of webs, especially paper webs, comprising an elongated shaft; a hollow cylindrical sleeve having a longitudinal axis, a transverse axis normal to said longitudinal axis, and a concave cylindrical internal surface spacedly surrounding said shaft; and at least one bearing shoe interposed between said shaft and said sleeve, said shoe being movable substantially radially of and tiltable relative to said shaft and defining with said shaft a plenum chamber for a supply of pressurized hydraulic fluid which urges said shoe in a direction toward said internal surface, said shoe having a convex cylindrical external surface adjacent to said internal surface and including a substantially centrally located primary hydrostatic bearing pocket communicating with said plenum chamber and at least four isolated auxiliary hydrostatic bearing spockets spaced so as to effectively surround said primary pocket, said external surface further including a marginal portion surrounding said pockets and lands separating said primary pocket from said auxiliary pockets, said primary pocket having arms extending to said marginal portion, flanked by said auxiliary pockets and substantially parallel with at least one of said axes, said primary pocket further having a central portion and said shoe having a single channel connecting said plenum chamber with the central portion of said primary pocket, said auxiliary pockets being isolated from the primary pocket without direct hydraulic fluid communication therebetween and being placed so as to receive fluid which leaks from said primary pocket and overflows along the respective lands between the primary pockets and the auxiliary pockets.

2. The roll of claim 1, wherein said primary pocket has four arms each of which is flanked by two auxiliary pockets, two of said arms being substantially parallel with one of said axes and the remaining two arms being substantially parallel with the other of said axes.

3. The roll of claim 1, wherein said primary pocket has a cruciform shape.

4. The roll of claim 1, wherein said external surface has a substantially rectangular outline.

5. The roll of claim 4, wherein said external surface has two relatively long sides substantially parallel to one of said axes and two relatively short sides substantially parallel with the other of said axes.

6. The roll of claim 1, wherein the effective cross-sectional area of said primary pocket is between 0.7 and 1.5 times the effective cross-sectional area of said plenum chamber.

7. The roll of claim 1, wherein said primary pocket has the shape of a diamond.

8. The roll of claim 1, wherein said external surface has a substantially circular outline.

9. The roll of claim 8, wherein said auxiliary pockets are arcuate recesses in said external surface and said primary pocket has at least two arms each of which is flanked by two auxiliary pockets.

* * * * *